(12) United States Patent
Ogawa et al.

(10) Patent No.: US 12,002,362 B2
(45) Date of Patent: Jun. 4, 2024

(54) DRIVING ASSISTANCE DEVICE AND NON-TRANSITORY COMPUTER-READABLE STORAGE MEDIUM

(71) Applicant: DENSO CORPORATION, Kariya (JP)

(72) Inventors: Yusuke Ogawa, Kariya (JP); Hideyuki Honya, Kariya (JP); Toshiyuki Gotou, Kariya (JP)

(73) Assignee: DENSO CORPORATION, Kariya (JP)

( * ) Notice: Subject to any disclaimer, the term of this patent is extended or adjusted under 35 U.S.C. 154(b) by 169 days.

(21) Appl. No.: 17/848,063

(22) Filed: Jun. 23, 2022

(65) Prior Publication Data

US 2022/0324474 A1    Oct. 13, 2022

Related U.S. Application Data

(63) Continuation of application No. PCT/JP2021/007091, filed on Feb. 25, 2021.

(30) Foreign Application Priority Data

Mar. 16, 2020 (JP) ................. 2020-045412

(51) Int. Cl.
*G08G 1/0967* (2006.01)
*G08G 1/01* (2006.01)
*G08G 1/16* (2006.01)

(52) U.S. Cl.
CPC ........... *G08G 1/166* (2013.01); *G08G 1/0145* (2013.01); *G08G 1/096716* (2013.01)

(58) Field of Classification Search
CPC . G08G 1/166; G08G 1/0145; G08G 1/096716
See application file for complete search history.

(56) References Cited

U.S. PATENT DOCUMENTS

| | | | | |
|---|---|---|---|---|
| 3,509,525 | A * | 4/1970 | Levine | G08G 1/096783 340/901 |
| 2005/0134478 | A1 * | 6/2005 | Mese | G08G 1/096758 340/901 |
| 2011/0130964 | A1 * | 6/2011 | Kitagawa | G08G 1/096716 701/301 |
| 2012/0209487 | A1 * | 8/2012 | Busch | G08G 1/094 701/70 |
| 2013/0110315 | A1 * | 5/2013 | Ogawa | G08G 1/096716 701/1 |

(Continued)

FOREIGN PATENT DOCUMENTS

| | | | | |
|---|---|---|---|---|
| DE | 102011081609 A1 | * | 2/2013 | .......... B60W 30/143 |
| JP | 2009176172 A | * | 8/2009 | |

(Continued)

*Primary Examiner* — Andrew W Bee
(74) *Attorney, Agent, or Firm* — Harness, Dickey & Pierce, P.L.C.

(57) ABSTRACT

A speed maintenance instruction is output when a vehicle enters a next intersection and a predetermined condition is satisfied. It is determined whether a forward obstacle is disposed between the vehicle and the next intersection. A possibility of collision with the forward obstacle is determined if the forward obstacle is disposed between the vehicle and the next intersection and the vehicle maintains a current vehicle speed. When the possibility of collision is determined, the speed maintenance instruction is not output even if the predetermined condition is satisfied.

9 Claims, 9 Drawing Sheets

(56) References Cited

U.S. PATENT DOCUMENTS

| | | | | |
|---|---|---|---|---|
| 2013/0110316 A1* | 5/2013 | Ogawa | ............ | G08G 1/096725 |
| | | | | 701/1 |
| 2013/0245945 A1* | 9/2013 | Morita | ............... | G08G 1/09675 |
| | | | | 701/533 |
| 2014/0046581 A1* | 2/2014 | Ota | ................... | G08G 1/09626 |
| | | | | 701/408 |
| 2014/0222244 A1 | 8/2014 | Ogawa | | |
| 2015/0015421 A1* | 1/2015 | Krijger | ............ | G08G 1/096716 |
| | | | | 340/932 |
| 2016/0086486 A1* | 3/2016 | Maeda | ............ | G08G 1/096716 |
| | | | | 701/119 |
| 2016/0180710 A1* | 6/2016 | Maeda | ............ | G08G 1/096783 |
| | | | | 340/932 |
| 2017/0243481 A1* | 8/2017 | Neubecker | ....... | G08G 1/096716 |
| 2018/0075739 A1* | 3/2018 | Ginsberg | ............... | B60K 35/00 |
| 2018/0301026 A1* | 10/2018 | Yudanov | .............. | G08G 1/0141 |
| 2018/0346116 A1* | 12/2018 | Kundu | ................... | G08G 1/164 |
| 2019/0122548 A1* | 4/2019 | Sakuma | ................... | G08G 1/08 |
| 2019/0130199 A1* | 5/2019 | Pohl | ..................... | G08G 1/0145 |
| 2019/0359211 A1* | 11/2019 | Matsumoto | ............ | B60W 50/14 |
| 2019/0362628 A1* | 11/2019 | Matsumoto | ...... | G08G 1/096716 |
| 2020/0242924 A1* | 7/2020 | Publicover | ............ | G08G 1/087 |

FOREIGN PATENT DOCUMENTS

| | | | | |
|---|---|---|---|---|
| JP | | 4712562 B2 | 6/2011 | |
| JP | | 2012003543 A | 1/2012 | |
| JP | | 2012038082 A | 2/2012 | |
| JP | | 5459276 B2 | 4/2014 | |
| JP | | 2017004446 A | 1/2017 | |
| WO | WO-2013027112 A2 * | 2/2013 | ............... | G01D 7/04 |

\* cited by examiner

FIG. 2

| ICON | INSTRUCTION | TRANSMISSION CONTENT |
|---|---|---|
| A1 | MAINTAIN SPEED | IF MAINTAINING SPEED, YOU CAN PASS THROUGH TRAFFIC LIGHT |
| A2 | DECELERATE | IF DECELERATING, YOU CAN PASS THROUGH TRAFFIC LIGHT |
| A3 | STOP | STOP VEHICLE SINCE YOU CAN NOT PASS THROUGH TRAFFIC LIGHT |

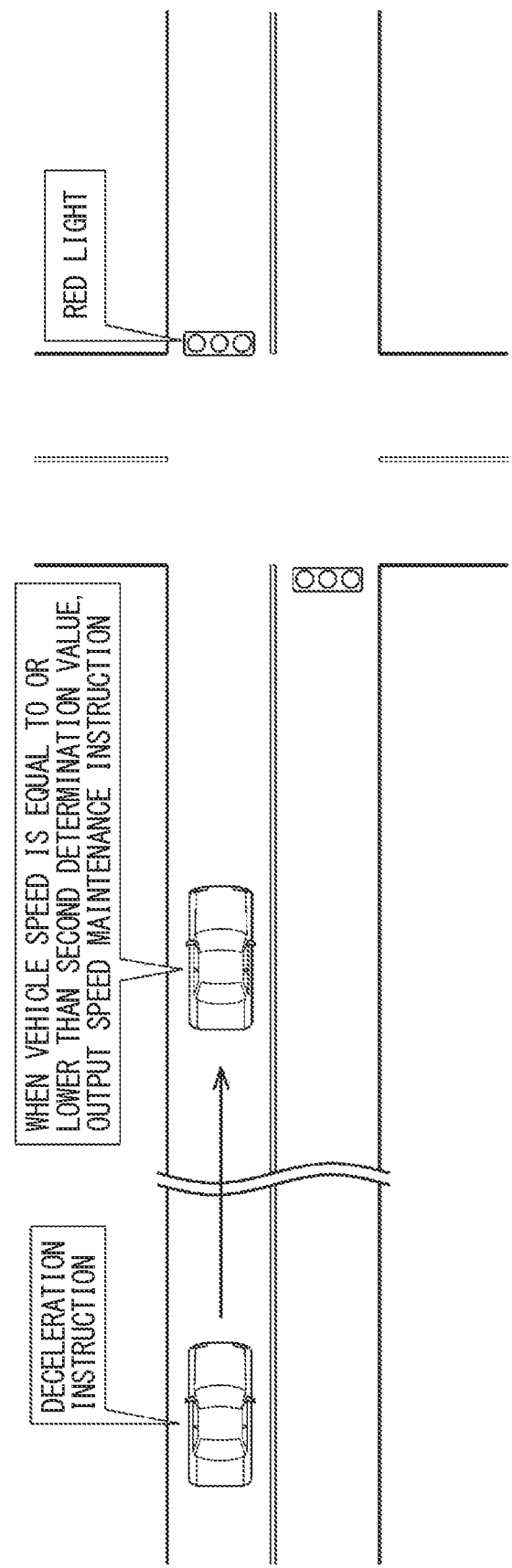

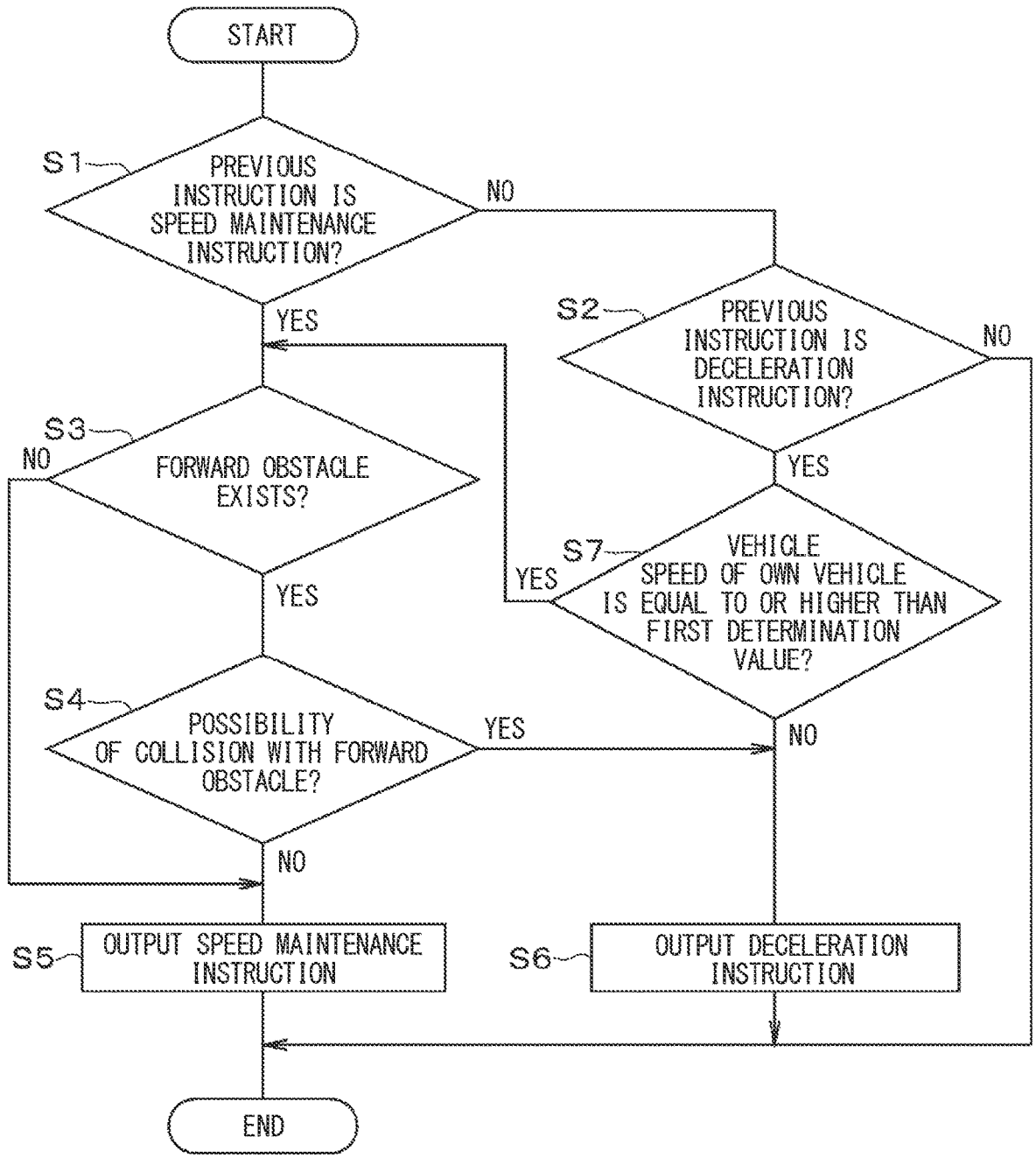

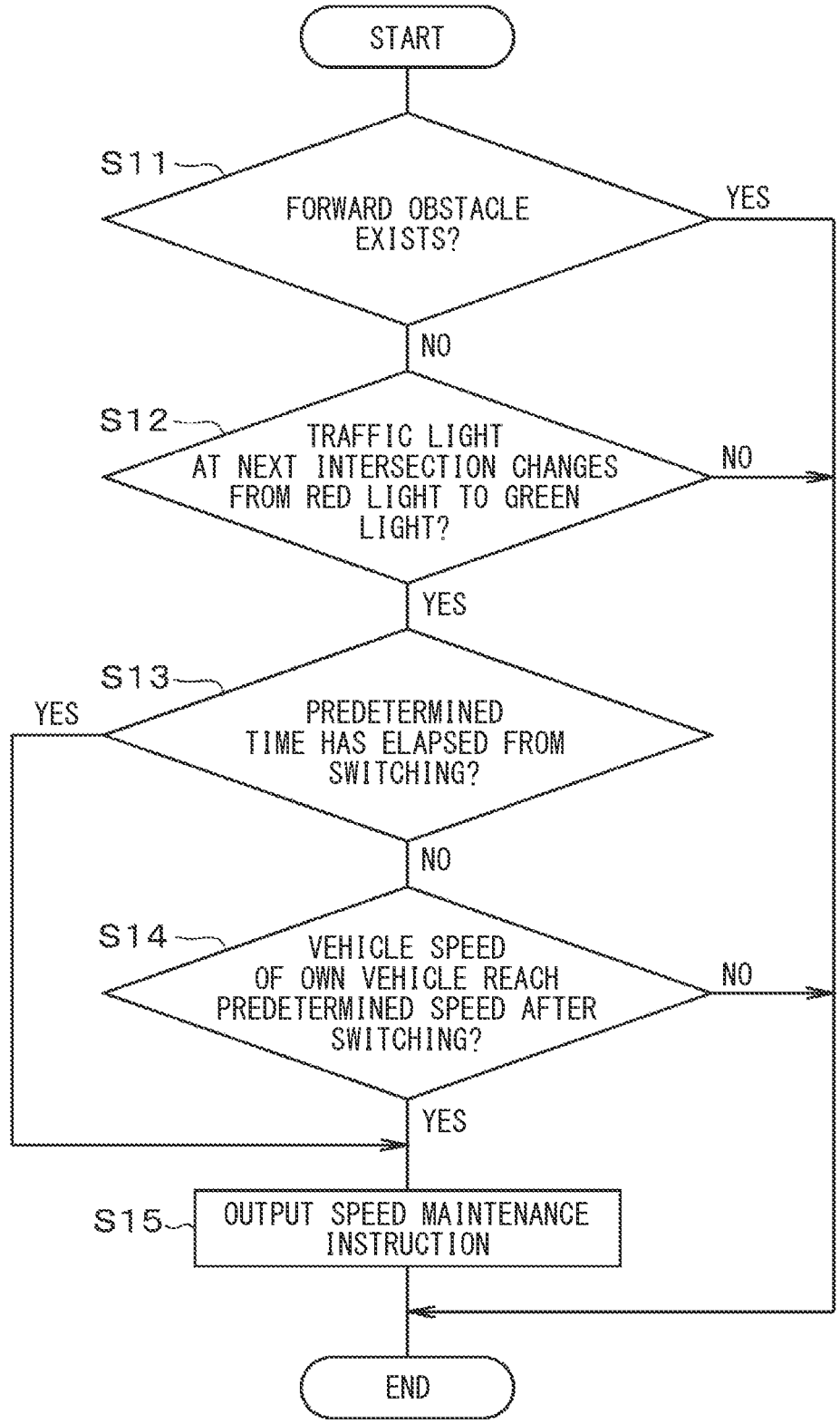

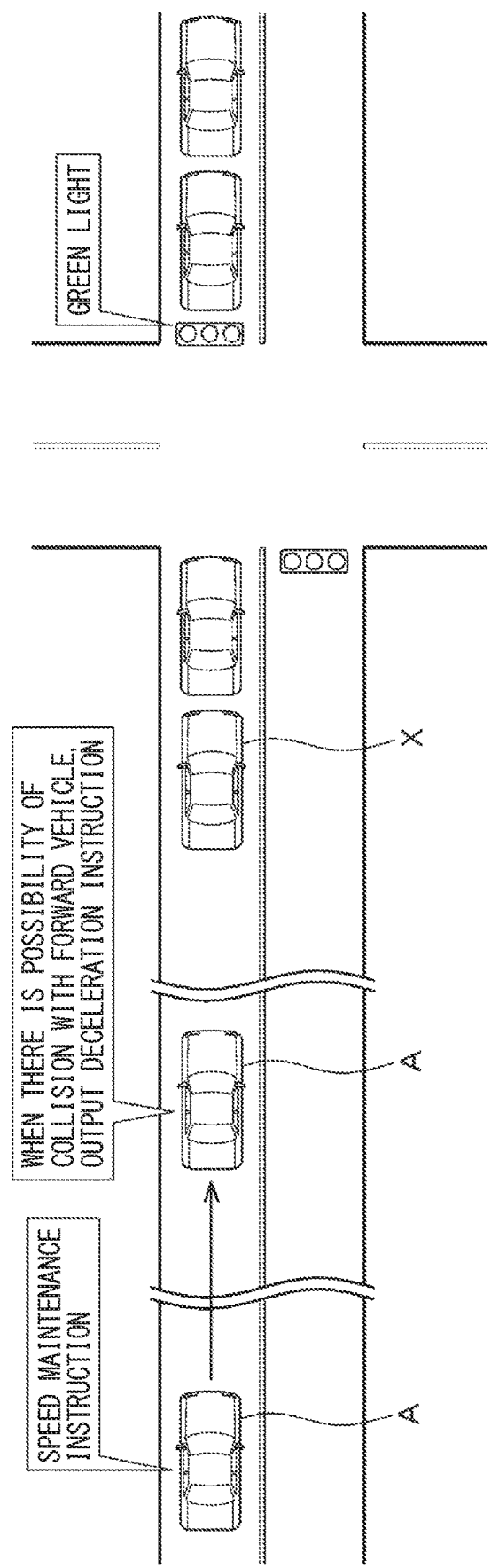

DRIVING ASSISTANCE DEVICE AND NON-TRANSITORY COMPUTER-READABLE STORAGE MEDIUM

The present application is a continuation application of International Patent Application No. PCT/JP2021/007091 filed on Feb. 25, 2021, which designated the U.S. and claims the benefit of priority from Japanese Patent Application No. 2020-045412 filed on Mar. 16, 2020. The entire disclosures of all of the above applications are incorporated herein by reference.

TECHNICAL FIELD

The present disclosure relates to a driving assistance device and a non-transitory computer-readable storage medium.

BACKGROUND

As a function of driving assistance, for example, there is a function of green light optimum speed recommendation according to a conceivable technique. The function of the green light optimum speed recommendation provides a function for calculating a relative relationship among the vehicle speed of the own vehicle, the distance from the vehicle position of the own vehicle to the stop line of the intersection, the lighting state of the traffic light, and the remaining lighting time so that the own vehicle can pass through without stopping at the next intersection while driving the vehicle, and outputting at least one of a speed maintenance instruction, a deceleration instruction, and a stop instruction so as to prompt the driver to execute the speed maintenance operation, the deceleration operation, and the stop operation. Specifically, when the traffic light at the next intersection is a red light, the speed maintenance instruction or the deceleration instruction is performed according to the vehicle speed of the own vehicle so that the own vehicle can enter the next intersection at the timing when the red light changes to the green light. When the traffic light at the next intersection is a green light, a speed maintenance instruction is output if the own vehicle can enter the intersection at the current vehicle speed, and no instruction is output if the vehicle cannot enter.

SUMMARY

According to an example, a speed maintenance instruction is output when a vehicle enters a next intersection and a predetermined condition is satisfied. It is determined whether a forward obstacle is disposed between the vehicle and the next intersection. A possibility of collision with the forward obstacle is determined if the forward obstacle is disposed between the vehicle and the next intersection and the vehicle maintains a current vehicle speed. When the possibility of collision is determined, the speed maintenance instruction is not output even if the predetermined condition is satisfied.

BRIEF DESCRIPTION OF THE DRAWINGS

The above and other objects, features and advantages of the present disclosure will become more apparent from the below-described detailed description made with reference to the accompanying drawings. In the drawings:

FIG. 2 is a diagram illustrating an icon;

FIG. 6 is a diagram showing an instruction mode when the own vehicle decelerates during a deceleration instruction.

FIG. 7 is a flowchart showing a forward obstacle determination process;

FIG. 8 is a flowchart showing a determination process immediately after switching; and FIG. 9 is a diagram showing a mode of an instruction.

DETAILED DESCRIPTION

Figure 1:
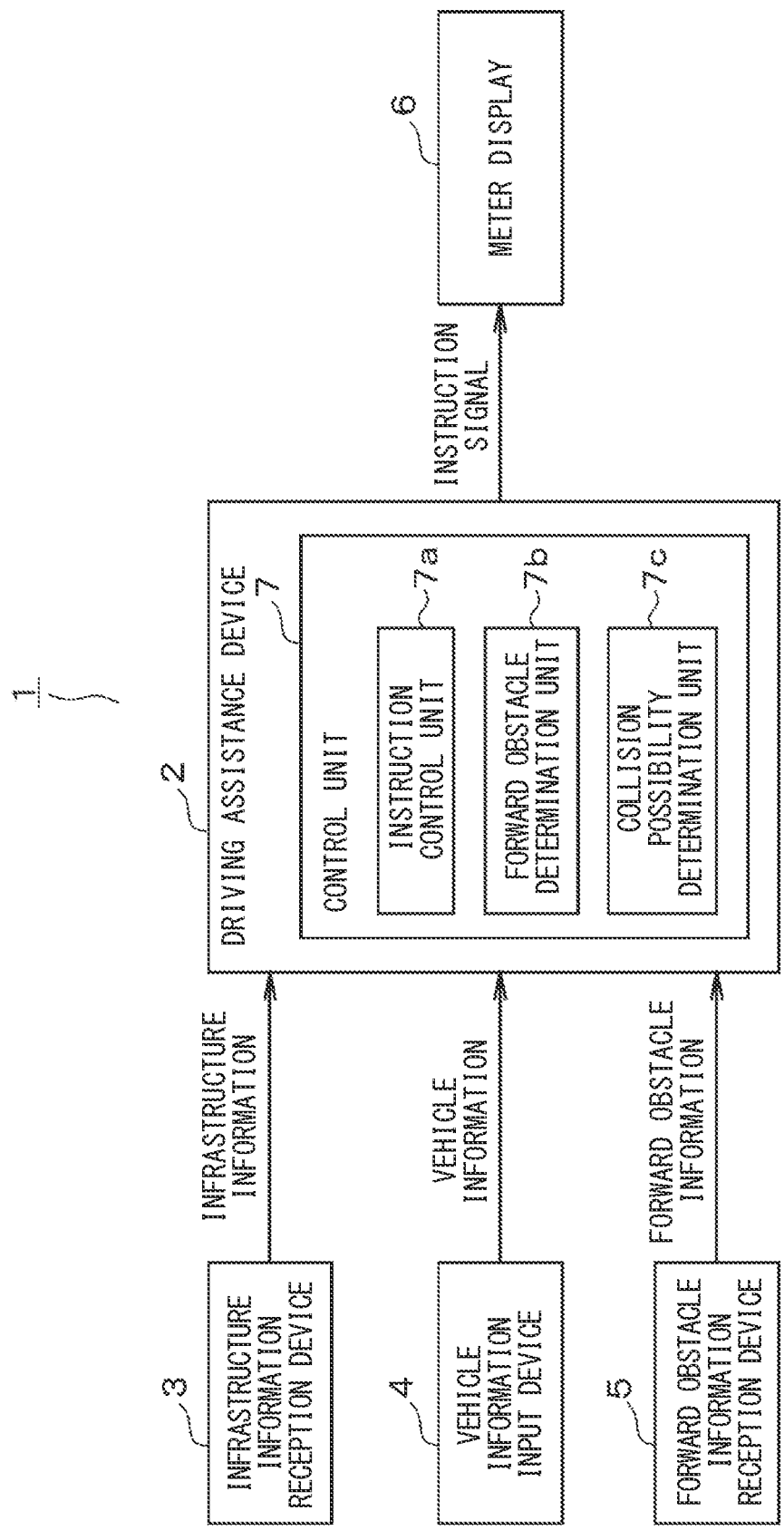
FIG. 1 is a block diagram showing an embodiment of the present disclosure.

In a conceivable technique, if the own vehicle maintains the current vehicle speed when the vehicle in front of the own vehicle is stopped due to traffic congestion or the like before the next intersection, the vehicle may collide with the vehicle in front. Therefore, it is desirable not to output the speed maintenance instruction when the own vehicle may collide with the vehicle in front. As a configuration for detecting a vehicle in front, a configuration for detecting with an in-vehicle camera, a millimeter-wave radar, or the like may be used. However, in a configuration that detects with an in-vehicle camera, a millimeter-wave radar, or the like, if the lens is dirty or the visibility is poor, the accuracy of detecting the vehicle in front deteriorates, and it becomes difficult to properly detect the vehicle in front. Thus, there may be a risk that the speed maintenance instruction will be output incorrectly. It should be noted that such a difficulty may not be limited to the case where the vehicle in front is stopped before the next intersection, and the difficulty may also occur at the case where, for example, a pedestrian, a bicycle, or the like is stopped before the next intersection.

The present embodiments provide to appropriately detect a front obstacle between the vehicle position of the own vehicle and the next intersection, and to appropriately assist driving so as to avoid a collision with the front obstacle.

According to one aspect of the present embodiments, the instruction control unit outputs a speed maintenance instruction when a predetermined condition is satisfied while the own vehicle enters the next intersection. The front obstacle determination unit determines whether or not there is a front obstacle between the vehicle position of the own vehicle and the next intersection by at least one of vehicle-to-vehicle communication and road-to-vehicle communication. When the front obstacle determination unit determines that there is a front obstacle, the collision possibility determination unit determines whether or not the own vehicle may collide with the front obstacle when the current vehicle speed is maintained. When the collision possibility determination unit determines the possibility that the own vehicle may collide with the front obstacle if the own vehicle maintains the current vehicle speed, the instruction control unit does not output the speed maintenance instruction even if the predetermined condition is satisfied.

By determining whether or not there is an obstacle in front of the own vehicle by at least one of vehicle-to-vehicle communication and road-to-vehicle communication, a difficulty that is a concern in the configuration detected by an in-vehicle camera or a millimeter-wave radar can be solved, and the forward obstacle can be detected properly. If there is a possibility that the own vehicle may collide with the forward obstacle when the current vehicle speed is maintained, it is possible to prevent the driver from being prompted the speed maintenance operation by not instructing the speed maintenance. As a result, it is possible to appropriately detect the forward obstacle between the vehicle position of the own vehicle and the next intersection, and it is possible to appropriately assist driving so as to avoid a collision with the forward obstacle.

Hereinafter, one embodiment will be described with reference to the drawings of FIGS. 1 to 9. The driving assistance system 1 that supports the driving of a vehicle includes a driving assistance device 2, an infrastructure information reception device 3, a vehicle information input device 4, a forward obstacle information reception device 5, and a meter display 6. The infrastructure information reception device 3 performs road-to-vehicle communication with a road side device disposed on the road, receives the infrastructure information transmitted from the road side device, and outputs the received infrastructure information to the driving assistance device 2. The infrastructure information includes road information related to roads, traffic light information related to traffic lights at intersections, and the like. The road information includes speed limit information regarding the speed limit of the road, stop line position information regarding the stop line position of the intersection, and the like. The traffic light information includes lighting cycle information relating to a lighting cycle of a green signal, a yellow signal, and a red signal of a traffic light, signal change timing information relating to signal change timing, and the like. The road side device may be disposed at each intersection, or one road side device may be disposed for a plurality of intersections. The green light is a display indicating permission to enter the intersection, and the red light is a display indicating a stop of the vehicle before the intersection.

The vehicle information input device 4 inputs various vehicle information via an in-vehicle network such as CAN (Controller Area Network, registered trademark), and outputs the input vehicle information to the driving assistance device 2. The vehicle information includes vehicle speed information regarding the vehicle speed of the own vehicle output from the vehicle speed sensor, vehicle position information regarding the vehicle position of the own vehicle calculated by a GPS (Global Positioning System) receiver, and the like. The configuration may not be limited to the configuration in which the GPS is adopted as the satellite positioning system, and various GNSS (Global Navigation Satellite System) such as GLONASS, Galileo, BeiDou, and IRNSS may be adopted.

The forward obstacle information reception device 5 receives the forward vehicle information regarding the forward vehicle traveling in front of the own vehicle as the forward obstacle information. The forward obstacle information reception device 5 performs the vehicle-to-vehicle communication with the in-vehicle device mounted on the forward vehicle, receives the forward vehicle information transmitted from the in-vehicle device, and outputs the received forward vehicle information to the driving assistance device 2. Further, the forward vehicle information reception device 5 performs the road-to-vehicle communication with a road side device disposed on the road, receives the forward vehicle information transmitted from the road side device, and outputs the received forward vehicle information to the driving assistance device 2. The forward vehicle information is vehicle speed information regarding the vehicle speed of the forward vehicle in front of the own vehicle, an image taken by an in-vehicle camera mounted on the forward vehicle in front, and the like. The forward vehicle has the same meaning as the preceding vehicle that precedes the own vehicle.

The forward obstacle may not be limited to the vehicle in front, alternatively, it may be a tangible object in which the own vehicle has a risk of collision, and the forward vehicle information may include, for example, forward pedestrian information relating to the pedestrian crossing a road, forward bicycle information relating to a bicycle, and the like. That is, the forward obstacle information reception device 5 communicates with, for example, a mobile terminal carried by a pedestrian crossing the road, receives information about the mobile terminal transmitted from the mobile terminal, and receives the information about the movement of a pedestrian carrying the mobile terminal as forward pedestrian information. The forward obstacle information reception device 5 communicates with, for example, a mobile terminal carried by a rider who gets on a bicycle, receives information about the mobile terminal transmitted from the mobile terminal, and receives the information about the movement of the bicycle which the rider carrying the mobile terminal gets on as forward bicycle information.

When the meter display 6 inputs an instruction signal output from the driving assistance device 2, the meter display 6 displays an icon corresponding to the input instruction signal. As shown in FIG. 2, the meter display 6 selects and displays any one of the speed maintenance instruction icon A1, the deceleration instruction icon A2, and the stop instruction icon A3. When the meter display 6 inputs the speed maintenance instruction signal output from the driving assistance device 2, the meter display 6 displays the speed maintenance instruction icon A1. By displaying the speed maintenance instruction icon A1, the driver is prompted to perform the speed maintenance operation. When the deceleration instruction signal output from the driving assistance device 2 is input, the meter display 6 displays the deceleration instruction icon A2. By displaying the deceleration instruction icon A2, the driver is prompted to perform the deceleration operation. When the meter display 6 inputs the stop instruction signal output from the driving assistance device 2, the meter display 6 displays the stop instruction icon A3. By displaying the stop instruction icon A3, the driver is prompted to the stop operation.

The driving assistance device 2 includes a control unit 7 that is provided by a microcomputer having a CPU (Central Process Unit), a ROM (Read Only Memory), a RAM (Random Access Memory), and an I/O (Input/Output). The microcomputer executes a computer program stored in a non-transitory tangible storage medium, and executes a process corresponding to the computer program. The process performed by the microcomputer includes the process corresponding to the driving assistance program. The control unit 7 has an instruction control unit 7a, a forward obstacle determination unit 7b, and a collision possibility determination unit 7c.

The instruction control unit 7a uses the infrastructure information input from the infrastructure information reception device 3 and the vehicle information input from the vehicle information input device 4, calculates the relationship among the vehicle speed of the own vehicle, the distance from the vehicle position of the own vehicle to the stop line at the intersection, the lighting state of the traffic light and the remaining lighting time, determines at least one of the speed maintenance instruction, the deceleration instruction, and the stop instruction, and outputs the instruction signal corresponding to the determined instruction to the meter display 6. When the traffic light at the next intersection is a red light, the instruction control unit 7a determines the speed maintenance instruction or the deceleration instruction based on the vehicle speed of the own vehicle so as to be able to enter the next intersection at the timing of shifting from the red light to the green light, and outputs a speed maintenance instruction signal or a deceleration instruction signal to the meter display 6. When the traffic light at the next intersection is a green light, the instruction control unit 7a determines the speed maintenance instruction if the own vehicle can enter the intersection at the current vehicle speed, and outputs the speed maintenance instruction signal to the meter display 6. However, if it is impossible to enter, no instruction is determined and no instruction signal is output to the meter display 6. A case where the traffic light at the next intersection is a green light and the own vehicle can enter the intersection at the current vehicle speed corresponds to the condition that the predetermined condition is satisfied.

The forward obstacle determination unit 7b uses the forward obstacle information input from the forward obstacle information reception device 5 to determine whether or not there is a forward obstacle between the vehicle position of the own vehicle and the next intersection. That is, the forward obstacle determination unit 7b determines whether or not there is a forward obstacle between the vehicle position of the own vehicle and the next intersection by vehicle-to-vehicle communication or road-to-vehicle communication.

When the front obstacle determination unit 7b determines that the forward obstacle exists, the collision possibility determination unit 7c determines whether the collision margin time with respect to the forward obstacle is less than a predetermined time, and determines whether there is a possibility of collision with the forward obstacle if maintaining the current vehicle speed. When the collision possibility determination unit 7c determines that the distance from the vehicle position of the own vehicle to the forward obstacle is not sufficient and the collision margin time is less than the predetermined time, the collision possibility determination unit 7c determines that there is the possibility of collision with a forward obstacle if the own vehicle maintains the current vehicle speed. On the other hand, when the collision possibility determination unit 7c determines that the distance from the vehicle position of the own vehicle to the forward obstacle has a sufficient margin and the collision margin time is equal to or longer than the predetermined time, the collision possibility determination unit 7c determines that there is no possibility of collision with a forward obstacle even if the own vehicle maintains the current vehicle speed. In this case, when the front obstacle determination unit 7b determines that there is the possibility of collision with a forward obstacle if the own vehicle maintains the current vehicle speed, the instruction control unit 7a outputs the deceleration instruction without outputting the speed maintenance instruction even if the predetermined condition is satisfied.

Further, when the front obstacle determination unit 7b determines that there is no forward obstacle between the vehicle position of the own vehicle and the next intersection, the instruction control unit 7a does not output the speed maintenance instruction during a period from changing the traffic light at the next intersection from a red light to a green light to the elapse of a predetermined time or during a period from changing the traffic light at the next intersection from a red light to a green light until the vehicle speed of the own vehicle reaches the predetermined speed.

Figure 3:
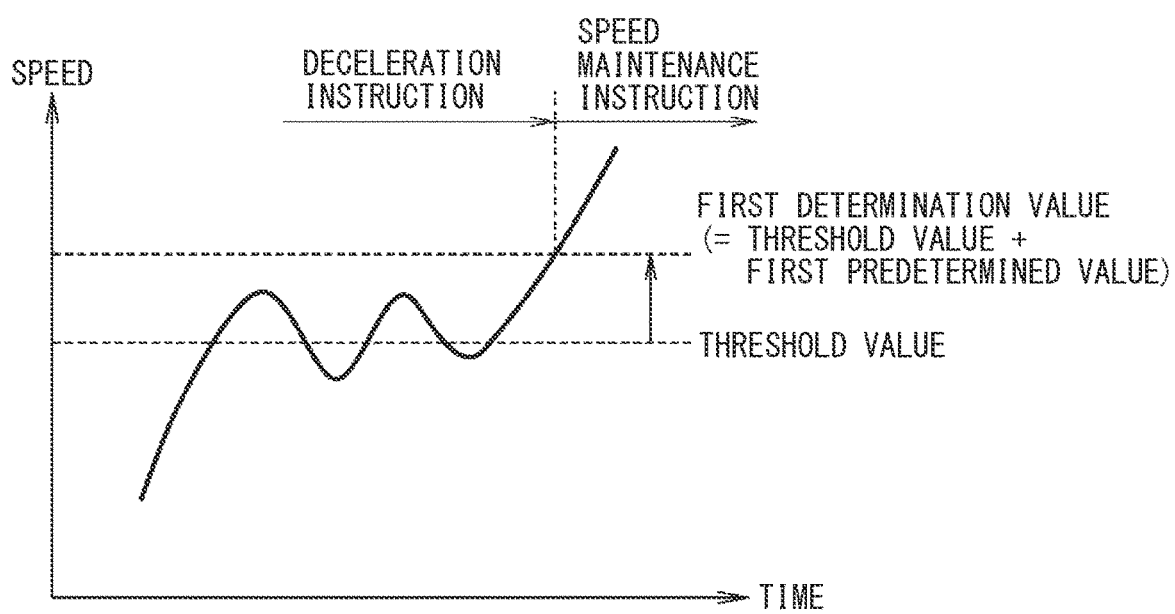
FIG. 3 is a diagram showing a change in vehicle speed when the own vehicle accelerates during a deceleration instruction.
Figure 4:
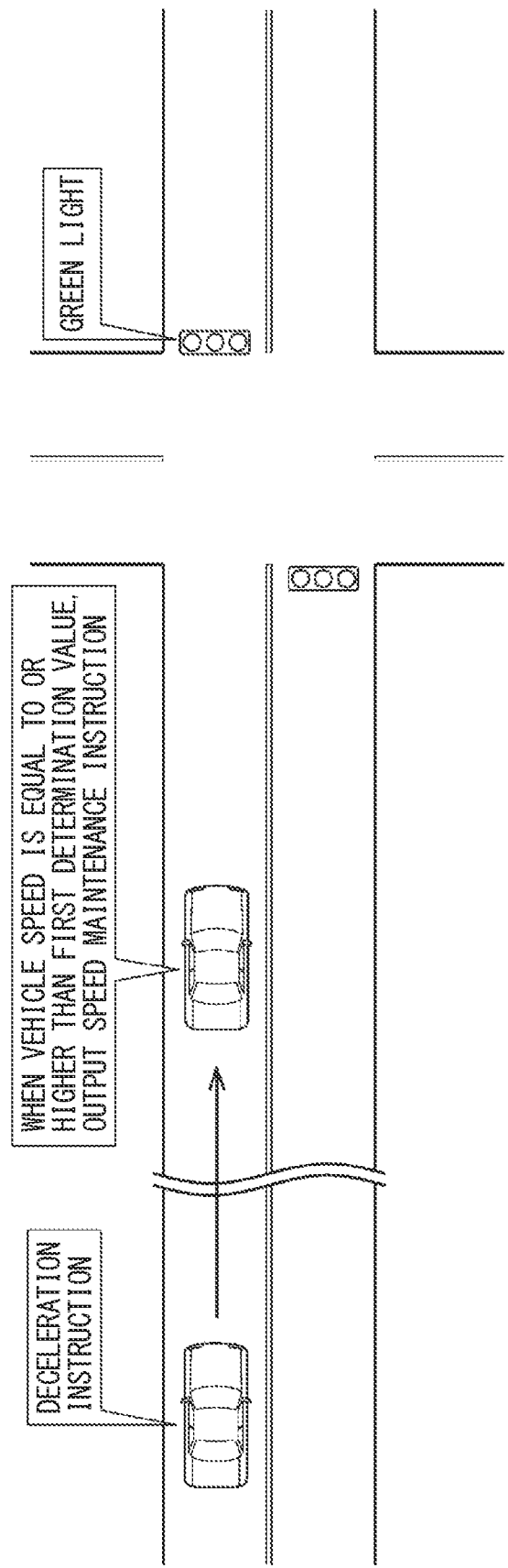
FIG. 4 is a diagram showing an instruction mode when the own vehicle accelerates during a deceleration instruction.
Figure 5:
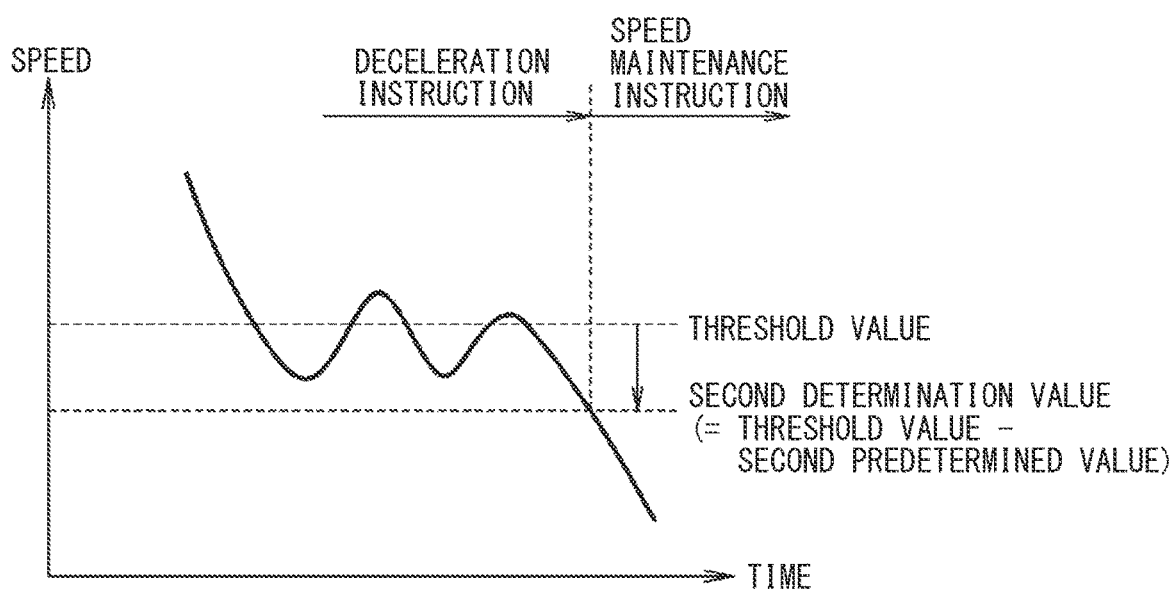
FIG. 5 is a diagram showing an instruction mode when the own vehicle decelerates during a deceleration instruction.

Further, as shown in FIGS. 3 and 4, when the traffic light at the intersection where the own vehicle is to enter next is a green light and the own vehicle accelerates during the deceleration instruction, the instruction control unit 7a of the own vehicle does not output the speed maintenance instruction even if the vehicle speed of the own vehicle becomes equal to or higher than the threshold value, and output the speed maintenance instruction after the vehicle speed becomes equal to or higher than the first determination value obtained by adding the first predetermined value to the threshold value. As shown in FIGS. 5 and 6, when the traffic light at the intersection where the own vehicle is to enter next is a red light and the own vehicle decelerates during the deceleration instruction, the instruction control unit 7a does not output the speed maintenance instruction even if the vehicle speed of the own vehicle becomes equal to or lower than the threshold value, and output the speed maintenance instruction after the vehicle speed becomes equal to or lower than the second determination value obtained by subtracting the second predetermined value from the threshold value.

Next, an operation of the above configuration will be described with reference to FIGS. 7 to 9. Here, the forward obstacle determination process for determining whether or not there is a forward obstacle between the vehicle position of the own vehicle and the next intersection, and the determination process immediately after switching for determining whether it is immediately after the traffic light at the next intersection is switched from the red light to the green light will be explained.

(1) Forward Obstacle Determination Process

In the driving assistance device 2, when the control unit 7 starts the forward obstacle determination process, it determines whether or not the previous instruction is the speed maintenance instruction (at S1). When the control unit 7 determines that the previous instruction is the speed maintenance instruction ("YES" at S1), the control unit 7 determines whether or not a forward obstacle is disposed between the vehicle position of the own vehicle and the next intersection (at S3, corresponding to the first procedure). When the control unit 7 determines that no forward obstacle is disposed between the vehicle position of the own vehicle and the next intersection ("NO" at S3), the control unit 7 outputs a speed maintenance instruction (at S5) and ends the forward obstacle determination process. That is, the control unit 7 continues the speed maintenance instruction and continues to display the speed maintenance instruction icon A1 on the meter display 6.

On the other hand, when the control unit 7 determines that the forward obstacle is disposed between the vehicle position of the own vehicle and the next intersection ("YES" at S3), the control unit 7 determines whether there is a possibility of collision with the forward obstacle if the own vehicle maintains the current vehicle speed (at S4, corresponding to the second procedure). When the control unit 7 determines that the collision margin time is equal to or longer than a predetermined time and determines that there is no possibility of the own vehicle colliding with the forward obstacle even if the own vehicle maintains the current vehicle speed ("NO" at S4), in this case also, the control unit 7 outputs the speed maintenance instruction (at S5), and ends the forward obstacle determination process. That is, the control unit 7 continues the speed maintenance instruction and continues to display the speed maintenance instruction icon A1 on the meter display 6.

On the other hand, when the control unit 7 determines that the collision margin time is less than a predetermined time and determines that there is the possibility of the own vehicle colliding with the forward obstacle if the own vehicle maintains the current vehicle speed ("YES" at S4), the control unit 7 does not output the speed maintenance instruction but outputs the deceleration instruction (at S6, corresponding to the third procedure), and ends the forward obstacle determination process. That is, the control unit 7 switches from the speed maintenance instruction to the deceleration instruction, and switches the display of the speed maintenance instruction icon A1 on the meter display 6 to the display of the deceleration instruction icon A2.

When the control unit 7 determines that the previous instruction is not the speed maintenance instruction ("NO" at S1), the control unit 7 determines whether or not the previous instruction is a deceleration instruction (at S2). When the control unit 7 determines that the previous instruction is the deceleration instruction ("YES" at S2), the control unit 7 determines whether or not the vehicle speed of the own vehicle is equal to or higher than the first determination value (at S7). When the control unit 7 determines that the vehicle speed of the own vehicle is equal to or higher than the first determination value ("YES" at S7), the control unit 7 performs the above-mentioned step S3 and subsequent steps. When the control unit 7 determines that the vehicle speed of the own vehicle is not equal to or higher than the first determination value ("NO" at S7), the control unit 7 outputs the deceleration instruction (at S6) and ends the forward obstacle determination process. That is, the control unit 7 continues the deceleration instruction and continues to display the deceleration instruction icon A2 on the meter display 6.

As shown in FIG. 9, the control unit 7 performs the above-mentioned forward obstacle determination process, so that the control unit 7 switches from the speed maintenance instruction to the deceleration instruction when the forward vehicle X is stopped before the next intersection, for example, due to a traffic jam during the speed maintenance instruction, and the control unit 7 determines that there is the possibility of collision with the forward vehicle X if the own vehicle A maintains the current vehicle speed. By switching from the speed maintenance instruction to the deceleration instruction and switching from the display of the speed maintenance instruction icon A1 to the display of the deceleration instruction icon A2 on the meter display 6 in this way, the deceleration instruction operation can be urged to the driver. The same applies not only when the forward vehicle X is stopped before the next intersection, but also when, for example, a pedestrian, a bicycle, or the like is stopped before the next intersection.

(2) Determination Process Immediately After Switching

When the control unit 7 starts the determination process immediately after switching, it determines whether or not there is a forward obstacle (at S11). When the control unit 7 determines that there is no forward obstacle ("NO" at S11), the control unit 7 determines whether or not the traffic light at the next intersection has switched from the red signal to the green signal (at S12). When the control unit 7 determines that the traffic light at the next intersection has switched from the red signal to the green signal ("YES" at S12), the control unit 7 determines whether or not a predetermined time has elapsed since the switching (at S13). When it is determined that a predetermined time has elapsed since the switching ("YES" at S13), the control unit 7 outputs a speed maintenance instruction (at S15) and ends the determination process immediately after the switching.

When the control unit 7 determines that the predetermined time has not elapsed since the switching ("NO" at S13), the control unit 7 determines whether or not the vehicle speed of the own vehicle has reached the predetermined speed after the switching (at S14). When the control unit 7 determines that the vehicle speed of the own vehicle has reached a predetermined speed after switching ("YES" at S14), the control unit 7 also outputs the speed maintenance instruction (at S15) and ends the determination process immediately after switching. When the control unit 7 determines that the vehicle speed of the own vehicle has not reached the predetermined speed after the switching ("NO" at S14), the control unit 7 does not output the speed maintenance instruction and ends the determination process immediately after the switching.

In the above configuration, the presence of an obstacle in front may be determined by an in-vehicle camera, a millimeter-wave radar, or the like, and a configuration of determining whether or not there is a forward obstacle by vehicle-to-vehicle communication or road-to-vehicle communication and a configuration of determining whether or not there is a forward obstacle by an in-vehicle camera, a millimeter wave radar, or the like may be used in combination. In a situation where vehicle-to-vehicle communication and road-to-vehicle communication are possible, the determination result of vehicle-to-vehicle communication and road-to-vehicle communication may be adopted. In a situation where the vehicle-to-vehicle communication or the road-to-vehicle communication is not possible, a determination result such as an in-vehicle camera or a millimeter-wave radar may be adopted.

As described above, according to the present embodiment, the following effects can be obtained. The driving assistance device 2 determines whether or not there is a forward obstacle disposed between the vehicle position of the own vehicle and the next intersection by vehicle-to-vehicle communication or road-to-vehicle communication, and des not outputs the speed maintenance instruction even when the predetermined condition is satisfied if the forward obstacle is disposed between the vehicle position of the own vehicle and the next intersection, and the own vehicle maintains the current vehicle speed so that there is a possibility of collision with the forward obstacle.

By determining whether or not there is an obstacle in front of the own vehicle by vehicle-to-vehicle communication and/or road-to-vehicle communication, a difficulty that is a concern in the configuration detected by an in-vehicle camera or a millimeter-wave radar can be solved, and the forward obstacle can be detected properly. If there is a possibility that the own vehicle may collide with the forward obstacle when the current vehicle speed is maintained, it is possible to prevent the driver from being prompted the speed maintenance operation by not instructing the speed maintenance. As a result, it is possible to appropriately detect the forward obstacle between the vehicle position of the own vehicle and the next intersection, and it is possible to appropriately assist driving so as to avoid a collision with the forward obstacle. That is, by at least not displaying the speed maintenance instruction icon A1 and not prompting the driver to perform the speed maintenance operation, it is possible to appropriately support driving so as to avoid a collision with a forward obstacle.

Further, the driving assistance device 2 outputs the deceleration instruction without outputting the speed maintenance instruction even when the predetermined condition is satisfied if the forward obstacle is disposed between the vehicle position of the own vehicle and the next intersection, and the own vehicle maintains the current vehicle speed so that there is a possibility of collision with the forward obstacle. By outputting a deceleration instruction, the driver can be prompted to execute the deceleration operation. That is, by displaying the deceleration instruction icon A2 without displaying the speed maintenance instruction icon A1 and prompting the driver to perform a deceleration operation, it is possible to appropriately support driving so as to avoid a collision with a forward obstacle.

Further, the driving assistance device 2 does not output the speed maintenance instruction until the predetermined time has elapsed after the traffic light at the next intersection switches from the red light to the green light when no forward obstacle is disposed between the vehicle position of the own vehicle and the next intersection. There may be a high possibility that the vehicle can pass the next intersection during the period until the predetermined time has elapsed without any obstacles ahead of the vehicle, so in such a case, by not outputting the speed maintenance instruction, it is possible to avoid the stress of the driver of displaying the maintenance instruction icon A1.

Further, the driving assistance device 2 does not output the speed maintenance instruction until the vehicle speed of the own vehicle reaches the predetermined speed after the traffic light at the next intersection switches from the red light to the green light when no forward obstacle is disposed between the vehicle position of the own vehicle and the next intersection. In the period until the vehicle speed of the own vehicle reaches the predetermined speed without any obstacles ahead of the own vehicle, it may be highly possible that the own vehicle can pass the next intersection in this case as well, so in such a case, by not outputting the speed maintenance instruction, it is possible to avoid the stress of the driver of displaying the maintenance instruction icon A1.

Further, when the traffic light at the intersection where the own vehicle is to enter next is a green light and the own vehicle accelerates during the deceleration instruction, the driving assistance device 2 of the own vehicle does not output the speed maintenance instruction even if the vehicle speed of the own vehicle becomes equal to or higher than the threshold value, and outputs the speed maintenance instruction after the vehicle speed becomes equal to or higher than the first determination value obtained by adding the first predetermined value to the threshold value. By giving hysteresis when switching from the deceleration instruction to the speed maintenance instruction under a condition that the own vehicle accelerates during the deceleration instruction, it is possible to avoid the situation where the deceleration instruction and the speed maintenance instruction are frequently switched since the vehicle speed of the own vehicle frequently fluctuates around the threshold value. That is, it is possible to avoid the stress of the driver of frequently switching the display of the deceleration instruction icon A2 and the speed maintenance instruction icon A1.

When the traffic light at the intersection where the own vehicle is to enter next is a red light and the own vehicle decelerates during the deceleration instruction, the driving assistance device 2 does not output the speed maintenance instruction even if the vehicle speed of the own vehicle becomes equal to or lower than the threshold value, and output the speed maintenance instruction after the vehicle speed becomes equal to or lower than the second determination value obtained by subtracting the second predetermined value from the threshold value. By giving hysteresis when switching from the deceleration instruction to the speed maintenance instruction under a condition that the own vehicle decelerates during the deceleration instruction, it is possible to avoid the situation where the deceleration instruction and the speed maintenance instruction are frequently switched since the vehicle speed of the own vehicle frequently fluctuates around the threshold value. That is, also in this case, it is possible to avoid the stress of the driver of frequently switching the display of the deceleration instruction icon A2 and the speed maintenance instruction icon A1.

Although the present disclosure has been described in accordance with the embodiments, it is understood that the present disclosure is not limited to the embodiments and structures described above. The present disclosure encompasses various modification examples or variations within the scope of equivalents. Various combinations or forms as well as other combinations or forms including only one element, one or more elements, or one or less elements, fall within the scope or the spirit of the present disclosure.

The controllers and methods thereof described in the present disclosure in the above embodiments may be implemented by one or more than one special-purpose computer. Such a computer may be created (i) by configuring (a) a memory and a processor programmed to execute one or more particular functions embodied in computer programs, or (ii) by configuring (b) a processor provided by one or more special purpose hardware logic circuits, or (iii) by configuring a combination of (a) a memory and a processor programmed to execute one or more particular functions embodied in computer programs and (b) a processor provided by one or more special purpose hardware logic circuits. The computer program may be stored, as an instruction executed by a computer, in a computer-readable non-transitory tangible storage medium. Alternatively, the control unit and the method according to the present disclosure may be achieved by a dedicated computer provided by constituting a processor with one or more dedicated hardware logic circuits. Alternatively, the control unit and the method according to the present disclosure may be achieved using one or more dedicated computers constituted by a combination of the processor and the memory programmed to execute one or more functions and the processor with one or more hardware logic circuits. The computer program may also be stored on a computer readable and non-transitory tangible recording medium as instructions executed by a computer.

For example, the head-up display may be configured such that the speed maintenance instruction icon A1, the deceleration instruction icon A2, and the stop instruction icon A3 are displayed. It may be configured to give a speed maintenance instruction, a deceleration instruction, and a stop instruction by voice output. A configuration in which a speed maintenance instruction, a deceleration instruction, and a stop instruction are given by display and a configuration in which speed maintenance instruction, a deceleration instruction, and a stop instruction are given by a voice output may be used in combination.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A driving assistance device comprising:
    an instruction control unit that outputs a speed maintenance instruction by displaying a speed maintenance instruction icon for prompting a driver to execute a speed maintenance operation when a vehicle enters a next intersection and a predetermined condition is satisfied;
    a forward obstacle determination unit that determines whether a forward obstacle is disposed between a vehicle position of the vehicle and the next intersection by at least one of vehicle-to-vehicle communication and road-to-vehicle communication; and
    a collision possibility determination unit that determines whether there is a possibility of collision with the forward obstacle if the forward obstacle is disposed between the vehicle position and the next intersection and the vehicle maintains a current vehicle speed, wherein:
    when the collision possibility determination unit determines that there is the possibility of collision with the forward obstacle if the vehicle maintains the current vehicle speed, the instruction control unit does not output the speed maintenance instruction even if the predetermined condition is satisfied.

2. The driving assistance device according to claim 1, wherein:
    when the forward obstacle determination unit determines that there is the possibility of collision with the forward obstacle if the vehicle maintains the current vehicle speed, the instruction control unit outputs a deceleration instruction without outputting the speed maintenance instruction even if the predetermined condition is satisfied.

3. The driving assistance device according to claim 1 wherein:
    the collision possibility determination unit determines that there is the possibility of collision with the forward obstacle if the vehicle maintains the current vehicle speed when determining that a collision margin time is less than a predetermined time.

4. The driving assistance device according to claim 1, wherein:
    when the forward obstacle determination unit determines that no forward obstacle is disposed between the vehicle position of the vehicle and the next intersection, the instruction control unit does not output the speed maintenance instruction until a predetermined time has elapsed after a display of a traffic light at the next intersection switches from a display indicative of a stop before the next intersection to a display indicative of a permission to enter the next intersection.

5. The driving assistance device according to claim 1, wherein:
    when the forward obstacle determination unit determines that no forward obstacle is disposed between the vehicle position of the vehicle and the next intersection, the instruction control unit does not output the speed maintenance instruction until a vehicle speed of the vehicle reaches a predetermined speed after a display of a traffic light at the next intersection switches from a display indicative of a stop before the next intersection to a display indicative of a permission to enter the next intersection.

6. The driving assistance device according to claim 1, wherein:
    in a case where a traffic light at the next intersection where the vehicle is to enter next indicates a permission to enter the next intersection, and the vehicle accelerates during a deceleration instruction, the instruction control unit outputs the speed maintenance instruction when the vehicle speed of the vehicle is equal to or higher than a predetermined threshold value and further equal to or higher than a first determination speed obtained by adding a first predetermined value and the predetermined threshold value.

7. The driving assistance device according to claim 1, wherein:
    in a case where a traffic light at the next intersection where the vehicle is to enter next indicates a stop before the next intersection, and the vehicle decelerates during a deceleration instruction, the instruction control unit outputs the speed maintenance instruction when the vehicle speed of the vehicle is equal to or lower than a predetermined threshold value and further equal to or lower than a second determination speed obtained by subtracting a second predetermined value from the predetermined threshold value.

8. The driving assistance device according to claim 1, further comprising:
    one or more processors; and
    a memory coupled to the one or more processors and storing program instructions that when executed by the one or more processors cause the one or more processors to provide at least: the instruction control unit; the forward obstacle determination unit; and the collision possibility determination unit.

9. A non-transitory tangible computer readable storage medium comprising instructions being executed by a computer, the instructions including a computer-implemented method for a control unit of a driving assistance device, which outputs a speed maintenance instruction by displaying a speed maintenance instruction icon for prompting a driver to execute a speed maintenance operation when a vehicle enters a next intersection and a predetermined condition is satisfied, the instructions including:
    determining whether a forward obstacle is disposed between a vehicle position of the vehicle and the next intersection by at least one of vehicle-to-vehicle communication and road-to-vehicle communication;
    determining whether there is a possibility of collision with the forward obstacle if determining that the forward obstacle is disposed between the vehicle position and the next intersection and the vehicle maintains a current vehicle speed; and not outputting the speed maintenance instruction even when the predetermined condition is satisfied if determining that there is the possibility of collision with the forward obstacle and the vehicle maintains the current vehicle speed.

* * * * *